United States Patent
Zhang et al.

(10) Patent No.: US 8,705,866 B2
(45) Date of Patent: *Apr. 22, 2014

(54) REGION DESCRIPTION AND MODELING FOR IMAGE SUBSCENE RECOGNITION

(75) Inventors: Ximin Zhang, San Jose, CA (US); Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 592 days.

This patent is subject to a terminal disclaimer.

(21) Appl. No.: 12/962,647

(22) Filed: Dec. 7, 2010

(65) Prior Publication Data

US 2012/0141019 A1 Jun. 7, 2012

(51) Int. Cl.
- G06K 9/46 (2006.01)
- G06K 9/62 (2006.01)
- G06K 9/00 (2006.01)
- G06K 9/48 (2006.01)

(52) U.S. Cl.
USPC .......... 382/195; 382/159; 382/165; 382/197; 382/224

(58) Field of Classification Search
None
See application file for complete search history.

(56) References Cited

U.S. PATENT DOCUMENTS

| | | | |
|---|---|---|---|
| 5,825,918 A | 10/1998 | Hoffmann et al. | |
| 6,990,233 B2 | 1/2006 | Park et al. | |
| 7,062,083 B2 | 6/2006 | Lim et al. | |
| 2002/0136449 A1 | 9/2002 | Park et al. | |
| 2006/0101060 A1* | 5/2006 | Li et al. | 707/102 |
| 2006/0215906 A1* | 9/2006 | Kim | 382/162 |
| 2007/0116365 A1* | 5/2007 | Kloer | 382/190 |
| 2008/0018784 A1 | 1/2008 | Bennett | |
| 2009/0263023 A1* | 10/2009 | Iwamoto | 382/199 |
| 2010/0098342 A1 | 4/2010 | Davis et al. | |
| 2011/0081082 A1* | 4/2011 | Jiang et al. | 382/170 |
| 2012/0128237 A1* | 5/2012 | Wang et al. | 382/159 |

OTHER PUBLICATIONS

Belongie et al, "Color- and Texture-Based Image Segmentation Using EM and Its Application to Content-Based Image Retrieval," 1998, Sixth International Conference on Computer Vision, Div. of Comput. Sci., California Univ., Berkeley, pp. 675-682.*

Juneja et al, "Performance Evaluation of Edge Detection Techniques for Images in Spatial Domain," 2009, International Journal of Computer Theory and Engineering, vol. 1, No. 5, pp. 614-621.*

* cited by examiner

Primary Examiner — Barry Drennan
Assistant Examiner — David F Dunphy
(74) Attorney, Agent, or Firm — John P. O'Banion (57) ABSTRACT

A method and apparatus is described here that categorizes images by extracting regions and describing the regions with a 16-dimensional subscene feature vector, which is a concatenation of color, texture, and spatial feature vectors. By comparing the spatial feature vectors in images with similarly-obtained feature vectors in a Gaussian mixture based model pool (obtained in a subscene modeling phase), the images may be categorized (in a subscene recognition phase) with probabilities relating to each region or subscene. Higher probabilities are likelier correlations. The device may be a single or multiple core CPU, or parallelized vector processor for characterizing many images. The images may be photographs, videos, or video stills, without restriction. When used real-time, the method may be used for visual searching or sorting.

14 Claims, 8 Drawing Sheets

REGION DESCRIPTION AND MODELING FOR IMAGE SUBSCENE RECOGNITION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image classification, and more particularly to image classification using subscene characterization. This invention relates to an apparatus and method for processing pictures, more particularly, to an apparatus and method for intrinsic image region feature extraction and image subscene recognition.

2. Description of Related Art

Image classification and object detection been investigated for many years. Image classification approaches have ranged from image retrieval by using color histogram in 1990s, to image matching using Scale-Invariant Feature Transform (or SIFT). However, currently available techniques still remain far away from customer expectations of non-expert image classification and object detection. Except for a few very well defined problems, such as face recognition, the problem of general image classification and object detection remains largely unsolved.

BRIEF SUMMARY OF THE INVENTION

An aspect of the invention is an image classification apparatus, comprising: a computer; and means for classifying an input image using the computer.

The means for classifying may comprise programming for executing steps comprising: subscene modeling; and performing subscene recognition.

The subscene modeling step may comprise programming for executing steps comprising: segmenting an input image training set from an image database into one or more segmented regions based on an input pool of N subscene categories; extracting a training region feature vector for each of the segmented regions corresponding to the input pool of N subscene categories; and forming a subscene model pool comprising training region feature vectors for each for the input pool of N subscene categories.

The computer may be capable of executing the means for classifying either sequentially or at least partially in parallel.

The performing subscene recognition step above may comprise: segmenting the input image into a set of input regions; extracting a region feature corresponding to each of the set of input regions to form a set of extracted region feature vectors; and filtering the set of extracted region features against the subscene model pool to form a filtered output.

The performing subscene recognition step may further comprise selecting the set of subscene categories corresponding to one or more of the largest filtered outputs.

The image classification apparatus above may further comprise: setting a subscene to one of a group consisting of: the training region feature vector above and the set of extracted region feature vectors above; and describing the subscene by a concatenated subscene feature vector $\vec{V}_{subscene}$ comprising: a color feature vector $\vec{V}_{color}$; a texture feature vector $\vec{V}_{texture}$; and a spatial feature vector $\vec{V}_{spatial}$; wherein the subscene is in a YCbCr color space with a luminance Y channel, a blue chrominance Cb channel, and a red chrominance Cr channel.

The color feature vector $\vec{V}_{color}$ may be calculated in the subscene using steps comprising: calculating a mean value of the luminance $\overline{Y}$ channel and mean values $\overline{Cb}$ and red $\overline{Cr}$ respectively for both the blue Cb and red Cr chrominance channels.

The color feature vector $\vec{V}_{color}$ may be calculated in the subscene using steps further comprising: calculating a two dimensional (2D) chrominance histogram of both the blue Cb and red Cr chrominance channels; wherein the histogram comprises bins.

The color feature vector $\vec{V}_{color}$ may be calculated in the subscene using steps comprising: calculating a subscene luminance variance as:

$$\text{Var}(Y) = \frac{1}{N}\sum_{i=1}^{N}(Y_i - \overline{Y})^2;$$

and calculating a subscene chrominance variance as:

$$\text{Var}(CbCr) = \frac{1}{N}\left(\sum_{i=1}^{N}(Cb_i - \overline{Cb})^2 + (Cr_i - \overline{Cr})^2\right)$$

where N denotes a number of pixels in the subscene, $Y_i$, $Cb_i$, and $Cr_i$ denote a pixel value in position i in the subscene in each of the luminance Y channel, and the blue Cb and red Cr chrominance channels, Y represents the mean value of Y, $\overline{Cb}$ represents the mean value of Cb, and $\overline{Cr}$ represents the mean value of Cr.

The color feature vector $\vec{V}_{color}$ may be calculated in the subscene using steps further comprising: setting a largest valued (2D) chrominance histogram bin's corresponding Cb and Cr values respectively as dominant values $D_{Cb}$ and $D_{Cr}$.

The color feature vector $\vec{V}_{color}$ may be calculated in the subscene using steps further comprising calculating a colorfulness value as $$\text{Colorfulness} = |D_{Cb} - D_{Cr}|$$

The color feature vector $\vec{V}_{color}$ may be calculated for the subscene using steps further comprising: forming a 6 dimension (6D) color feature vector ($\vec{V}_{color}$) as $\vec{V}_{color} = (\overline{Y}, \text{Var}(Y), \text{Var}(CbCr), D_{Cb}, D_{Cr}, \text{Colorfulness})$.

The texture feature vector $\vec{V}_{texture}$ may be calculated in the subscene using steps comprising: performing an edge detection procedure on the luminance channel (Y domain) to generate a set of edge points; categorizing each edge point into a horizontal, vertical, 45°, or 135° edge, non-directional edge, and non-edge point.

The texture feature vector $\vec{V}_{texture}$ may be calculated in the subscene using steps comprising: accumulating a sum of a normalized number of horizontal edge points (H) from the horizontal edge points; accumulating a sum of a normalized number of (V) vertical edge points from the vertical edge points; accumulating a sum of a normalized number of 45 degree ($N_{45}$) edge points from the 45° edge points; accumulating a sum of a normalized number of 135 degree ($N_{135}$) edge points from the 135° edge points; accumulating a sum of a normalized number of non-directional ($N_{non-directional}$) edge points from the non-directional edge points; forming a sum of a normalized number of horizontal and vertical (H+V) edge points from a sum of the horizontal and vertical edge points; forming a sum of a normalized number of 45 degree and 135 degree ($N_{45}+N_{135}$) edge points from a sum of the 45° and 135° edge points.

The texture feature vector $\vec{V}_{texture}$ may be calculated using steps comprising: forming a concatenated 6D texture feature vector ($\vec{V}_{texture}$), wherein $\vec{V}_{texture} = (H, V, \arg\max(N_{45}, N_{135}), N_{non-directional}, H+V, N_{45}+N_{135})$.

The spatial feature vector $\vec{V}_{spatial}$ may be calculated in the subscene using steps comprising: means for forming a rectangular bounding box around the subscene, wherein the rectangular bounding box has an upper left Y coordinate of $Y_A$, and the lower right Y coordinate of $Y_B$; calculating a Ratio of width over height of the rectangular bounding box; calculating a Compactness of the subscene; and forming the spatial feature vector, wherein $\vec{V}_{spatial} = (Y_A, Y_B, \text{Ratio}, \text{Compactness})$.

The subscene feature vector $\vec{V}_{subscene}$ may comprise: $\vec{V}_{subscene} = (\vec{V}_{color}, \vec{V}_{texture}, \vec{V}_{spatial})$; wherein $\vec{V}_{subscene}$ may be written in detail comprising:

$$\vec{V}_{substance} = \begin{pmatrix} \overline{Y}, \text{Var}(Y), \text{Var}(CbCr), D_{Cb}, D_{Cr}, \text{Colorfulness}, \\ H, V, \arg\max(N_{45}, N_{135}), N_{non-directional}, H+V, N_{45}+N_{135}, \\ Y_A, Y_B, \text{Ratio}, \text{Compactness} \end{pmatrix}.$$

The subscene modeling step may comprise means for selecting an optimal number of clusters in the step of forming the subscene model pool.

Another aspect of the invention is the image classification above, wherein the means for classifying are stored on a computer readable medium.

A still further aspect of the invention is the image classification apparatus above, wherein the performing subscene recognition step is performed on a set of photographs.

Still another aspect of the invention is an image classification apparatus, comprising: a computer; and a program executable on the computer for classifying an input; wherein said classifying comprises: performing subscene recognition; and performing subscene modeling; wherein said subscene modeling comprises: segmenting an input image training set from an image database into one or more segmented regions based on an input pool of N subscene categories; extracting a training region feature vector for each of the segmented regions corresponding to the input pool of N subscene categories; and forming a subscene model pool comprising training region feature vectors for each for the input pool of N subscene categories.

In the image classification apparatus above, the program executable may be stored on a computer readable medium as a program in either source code or object code.

In another aspect of the invention, an image classification apparatus, may comprise: a computer; and a programming executable on the computer for performing one or more steps comprising classifying an input image; wherein the classifying comprises programming for executing steps comprising: subscene modeling; and performing subscene recognition. A computer readable medium may be used for storing the programming executable.

Another aspect of the invention is an image classification apparatus, comprising: a computer; and programming means for classifying an input image using the computer.

In yet another aspect of the invention is a computer readable medium for storing a programming executable for means for classifying an input image using a computer.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

I. Introduction

With increased computational hardware now available, it becomes possible to create processes that were previously inconceivable. More and more intelligent features that emulate human capabilities are desirable for new products, thereby improving and easing human-machine interactions.

In our automobiles, for instance, people would like automatic detection of people behind or in front of the car to prevent accidents. Users would also like a camera or video recorder to automatically determine an optimal setup given ambient environmental conditions to take the best possible photographs and videos. In computers, users would also want their computers to automatically categorize personal or business photo collections. For video recordings, users would be intrigued with a camcorder that could automatically remove meaningless scenes and compile an attractive video clip. All of the foregoing applications, and many other related applications, cannot be realized without accurate image classification and object detection.

Since image classification and object detection is an area of great interest in both research and application, it has been investigated for many years. Many image classification approaches have been proposed, ranging from image retrieval by using color histogram in 1990s, to image matching using Scale-Invariant Feature Transform (or SIFT), which is an algorithm in computer vision used to detect and describe local features in images. However, extant techniques remain still far away from customer expectations of non-expert image classification and object detection. Except for a few very well defined problems, such as face recognition, the problem of general image classification and object detection remains largely unsolved.

Scene recognition and representation is an important branch in general image classification and object detection. Good scene recognition and representation techniques can greatly improve the performance of many computer vision applications, such as image categorization (natural grouping of images instead of clusters based on time or simple text descriptions), image retrieval (used to find images in archives based on visual similarity). It can also provide contextual information to improve the object recognition. For instance, if we know the scene represents a city street, then the probability of a vehicle will be much higher than a ship.

Currently, one to many words are typically used to describe a given scene. However, such annotations often lead to very different scenes having the same description. To address this problem here, an image is described with a set of meaningful regions or objects with certain spatial relationships. In this invention, the term "subscene" is used to represent a meaningful region or object within an image or video scene.

The aim here is to detect and classify each subscene within an image, and then to represent the subscene with a semantic label of low complexity without any human intervention. To do so, a region color extraction scheme is developed to extract the region color features; a region texture extraction scheme is developed to extract the region texture features; and a region spatial feature extraction scheme is developed to extract the spatial distribution features. By combining these features a multi-dimensional feature vector is generated to describe the subscene. Then a Gaussian mixture model is used to represent the subscene with the feature vector as the variable.

The parameters of the Gaussian mixture model are obtained by using an Expectation Maximization (EM) algorithm on all of the training data selected from an image database set. After the models for each subscene feature category are obtained, the subscene classification is done by voting on each of the subscene categories. The model with the maximum output is selected as the best description.

II. Overall Method Description

Figure 1A:
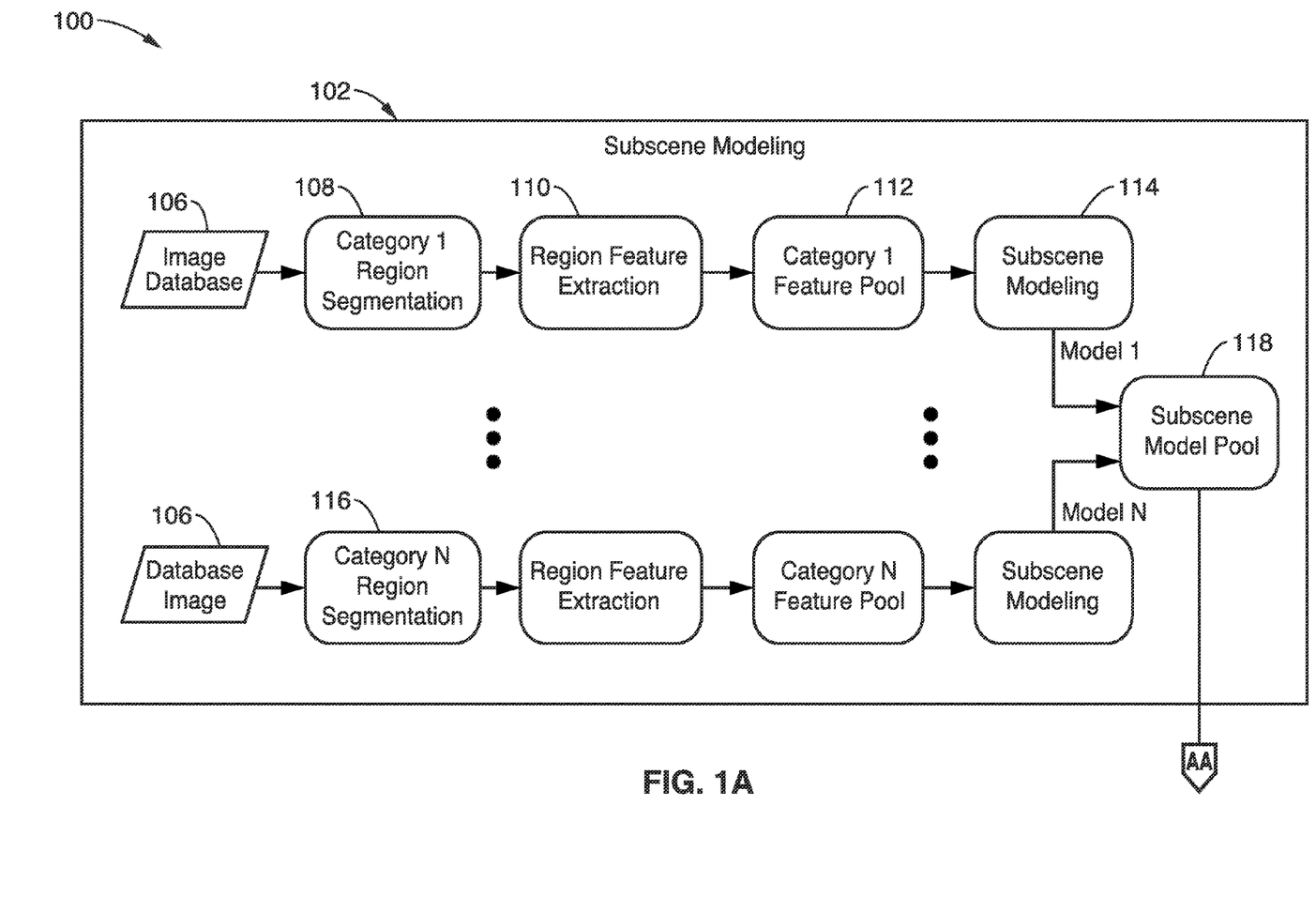
FIG. 1 is a flow chart of an overall method of subscene modeling and recognition.
Figure 1B:
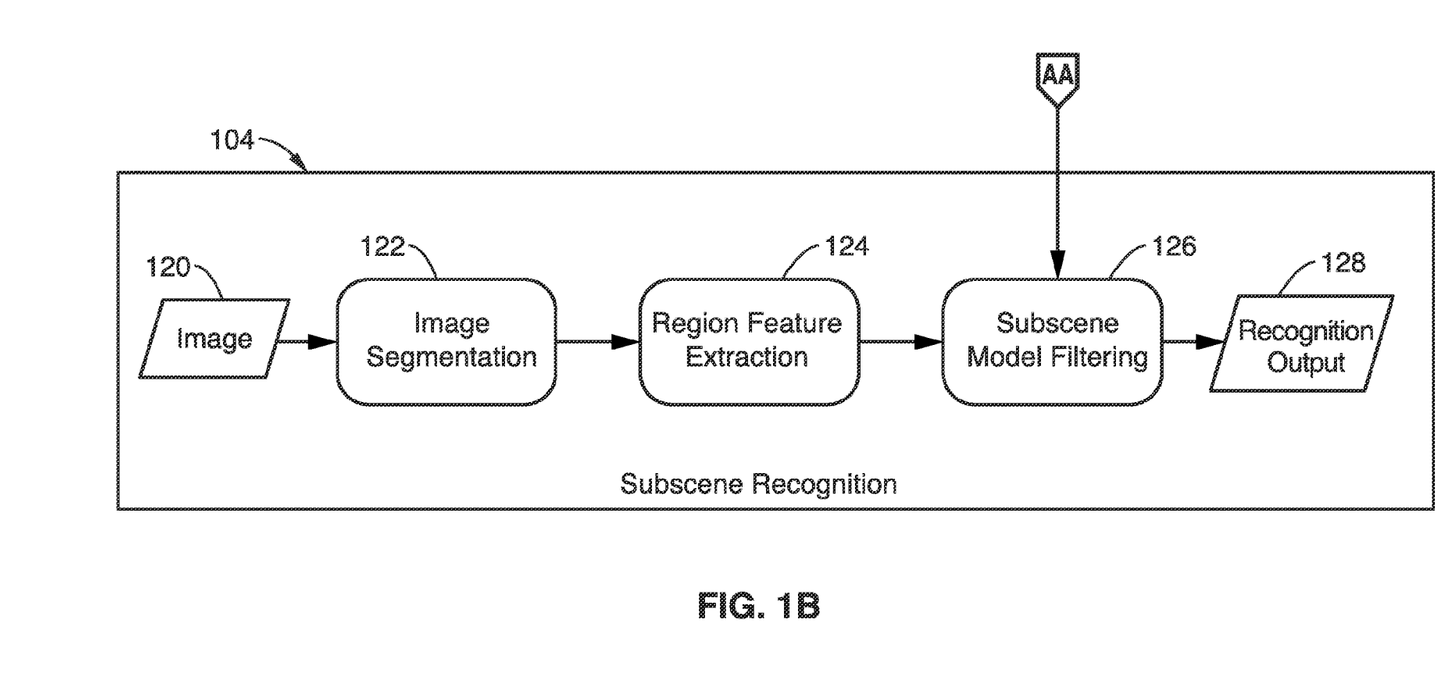

Refer now to FIGS. 1A and 1B, which form a flowchart of the overall architecture of the method 100. It consists of two sections: a subscene modeling section 102 and a subscene recognition section 104. In the subscene modeling section 102, the subscene representation model is obtained by the following procedure:

1. In the first step, the images comprising an image database 106 are first segmented 108 based on subscene categories. As an example, without limitation, if category 1 subscene represents a mountain, then the mountain within each image is segmented out as an independent region.

2. A region feature vector is extracted 110 from each segmented mountain region respectively.

3. After all the input mountain regions in the image database 106 are processed, the extracted features are stored in the Category 1 feature pool 112.

4. Then, features in the pool are used to learn a representation subscene model in the module Subscene Modeling 114.

5. Steps 1 to 4 are repeated until all the subscene models from category 1 through category N 116 are obtained. These individual N models are then stored in a subscene model pool 118.

Now in the subscene recognition section 104 of FIG. 1B, subscene recognition is conducted as follows:

1. An input image 120 is first segmented 122 into a set of regions.

2. For each region 122, the region feature is extracted 124.

3. The extracted region feature 124 is filtered 126 by all the subscene models present in the subscene model pool 118 in module "Subscene Model Filtering" and the subscene category with the largest numeric filtering output 128 is selected.

4. Steps 2 to 3 above are repeated until all the regions in the input image 120 are processed.

The technical details for these methods, and an example embodiment will be described in the following sections.

III. Region Feature Extraction

In the method described herein, a region feature comprises three kinds of features: a color feature, a texture feature, and a spatial feature. These will be described in detail below. In this invention, features are extracted in the YCbCr domain. Since most of the images are stored in RGB format, typically a format transformation from another format to YCbCr must be performed prior to feature extraction.

Color Feature Extraction

Figure 2:
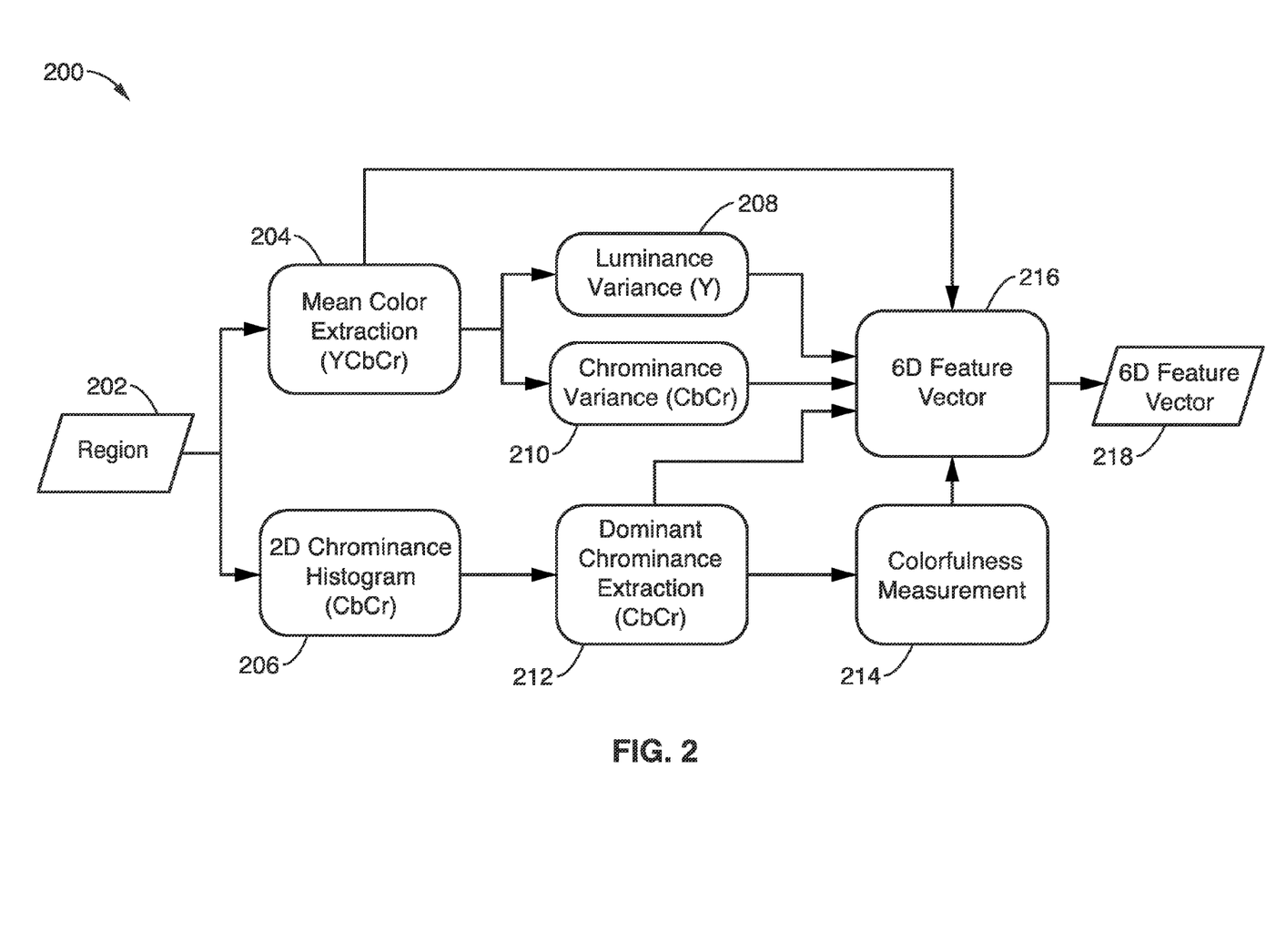
FIG. 2 is a flow chart of a region color feature extraction method.

Refer now to FIG. 2, which is a flow chart illustrating the region color feature extraction method 200, which is done as follows.

1. Initially, a subscene 202 is input.

2. Mean values of luminance channel (the Y domain) and the blue and red chrominance channels (the CbCr domain) are calculated in the module "Mean Color Extraction" 204, yielding respectively the average values $\overline{Y}$, $\overline{Cb}$, and $\overline{Cr}$.

3. Either concurrently (if processed with parallel hardware), or at a different time (using traditional computational methods without substantial parallelism) than "Mean Color Extraction" 204 step, a two dimensional (2D) chrominance histogram of the CbCr channel is calculated in the module "Chrominance Histogram" 206.

4. A regional luminance variance is calculated in the module "Luminance Variance" 208 as follows:

$$\mathrm{Var}(Y) = \frac{1}{N}\sum_{i=1}^{N}(Y_i - \overline{Y})^2$$

A regional chrominance variance is calculated in the module "Chrominance Variance" 210 as follows:

$$\mathrm{Var}(CbCr) = \frac{1}{N}\left(\sum_{i=1}^{N}(Cb_i - \overline{Cb})^2 + (Cr_i - \overline{Cr})^2\right)$$

where N denotes the number of pixels in the subscene region, $Y_i$, $Cb_i$, and $Cr_i$ denote the pixel value in position i in the subscene region in each color channel, $\overline{Y}$ represents the mean value of Y, $\overline{Cb}$ represents the mean value of Cb, and $\overline{Cr}$ represents the mean value of Cr.

5. After the 2D chrominance histogram 206 of the CbCr domain is obtained, the largest valued histogram bin is extracted in module "Dominant Chrominance Extraction (CbCr) 212, with the bin's corresponding Cb and Cr values recorded as $D_{Cb}$ and $D_{Cr}$ that are used as the dominant chrominance values.

6. After the dominant chrominance values $D_{Cb}$ and $D_{Cr}$ are obtained, a region colorfulness value is calculated as Colorfulness=$|D_{Cb}-D_{Cr}|$ in the "Colorfulness Measurement" module 214.

7. Finally, the above extracted values are combined to form a 6 dimension (6D) color feature vector ($\vec{V}_{color}$):

$\vec{V}_{color}=(\overline{Y},\mathrm{Var}(Y),\mathrm{Var}(CbCr),D_{Cb},D_{Cr},\mathrm{Colorfulness})$ in the "6D Feature Vector" formation module 216. The resultant output 6D feature vector 218 is the output of the color feature extraction.

Texture Feature Extraction

Figure 3:
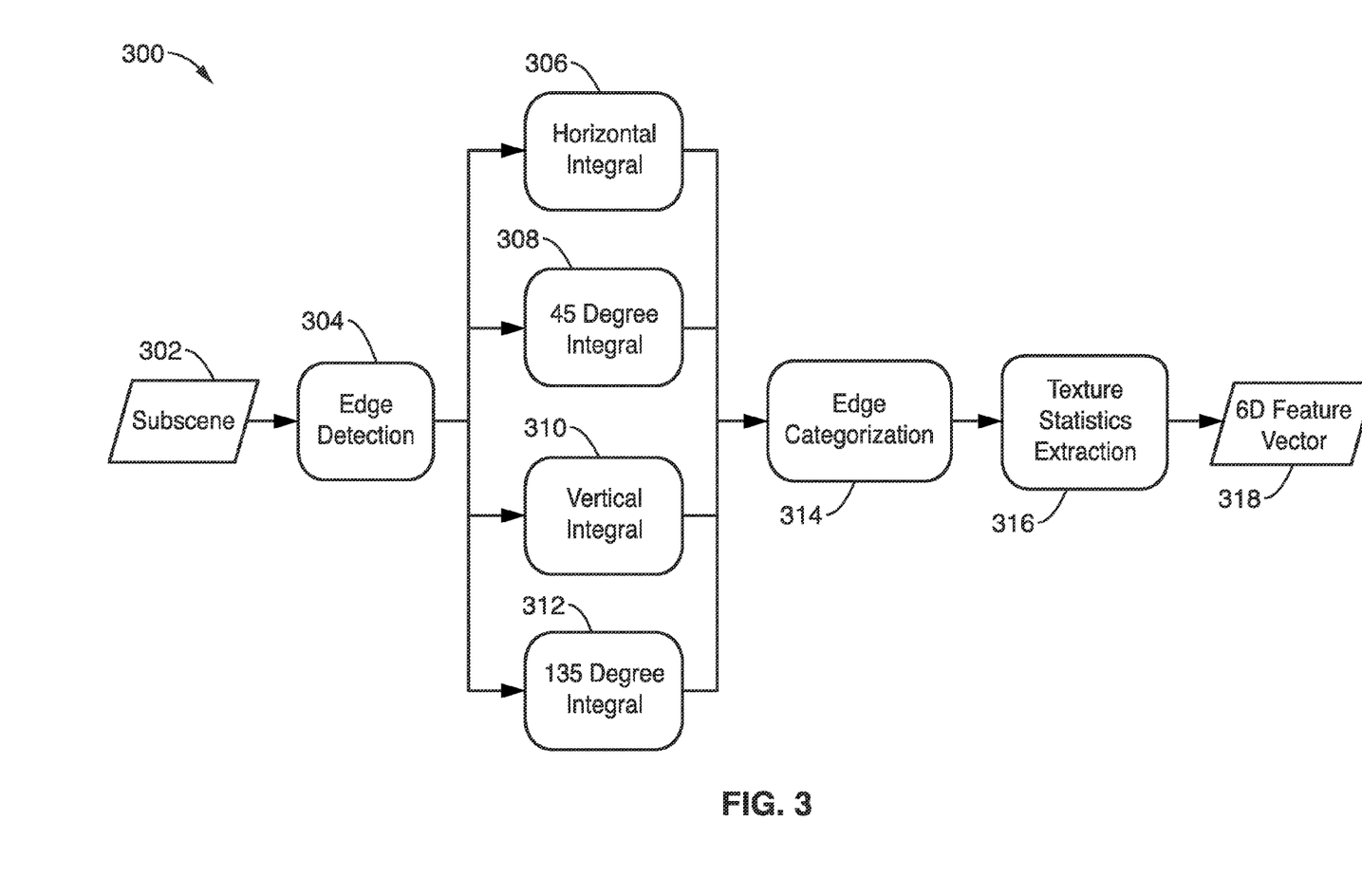
FIG. 3 is a flow chart of a region texture feature extraction method.

Refer now to FIG. 3, which is a flowchart illustrating the texture feature extraction method 300. Here, the texture feature is extracted by using the luminance channel as follows:

1. A subscene is input 302 that will have texture feature extraction.

2. An edge detection procedure is applied on the luminance channel (Y domain) in the module "Edge Detection" 304 to extract edge points within the subscene. The edge detection procedure may use any prior art edge detection method. In a current embodiment, the Canny edge detection (developed by John F. Canny) scheme is used.

3. After all the edge points are obtained, the integral image of edge points that have direction between −22.5° and +22.5° are calculated in the module "Horizontal Integral" 306, the integral image of edge points that have direction between +22.5° and +67.5° are calculated in the module "45 Degree Integral" 308, the integral image of edge points that have direction between +67.5° and +112.5° are calculated in the module "Vertical Integral" 310, and the integral image of edge points that have direction between +112.5° and +157.5° are calculated in the module "135 Degree Integral" 312. Since the calculation of the integral image follows procedures standard in the art, a detailed description is omitted here.

Depending on the hardware used for processing, the "Horizontal Integral" 306, "45 Degree Integral" 308, the module "Vertical Integral" 310, and the module "135 Degree Integral" 312 may be processed in parallel for an improvement in execution speed. Alternatively, they may be processed sequentially.

4. After step 3, the edge points are then categorized 314 into six point categories: horizontal edge, vertical edge, 45 degree edge, 135 degree edge, non-directional edge, and non-edge points. "Edge Categorization" 314 proceeds as follows:

a. For each edge point, which is used as the center of a 9×9 window, a total number of edge points within the window is calculated. If the total number or edge points is less than a threshold T1 (which is 24 in a current embodiment), then the point is categorized as non-edge point, and processing continues with the next edge point. Otherwise, processing continues with step b.

b. Count the total number of edge points that have direction between −22.5° and +22.5°. If the resulting number is larger than the threshold T1, this point is categorized as a horizontal edge point, and processing continues with the next edge point. Otherwise, processing continues with step c.

c. Count the total number of edge points that have direction between +22.5° and +67.5°. If the resulting number is larger than the threshold T1, this point is categorized as a 45 degree edge point, and the processing continues with the next edge point. Otherwise, processing continues with step d.

d. Count the total number of edge points that have direction between—+67.5° and +112.5°. If the resulting number is larger than the threshold T1, then the point is categorized as a vertical edge point, and processing continues with the next edge point. Otherwise, processing continues with step e.

e. Count the total number of edge points that have direction between +112.5° and +157.5°. If the resulting number is larger than the threshold T1, this point is categorized as a 135 degree edge point, and processing continues with the next edge point. Otherwise, the point is categorized as a non-directional edge point, and processing continues to the next edge point.

f. Repeat the above procedure until all the edge points have been processed.

5. After the categorization 314 of all edge points, the total number of the edge points in each direction category is normalized by the total number of pixels in the subscene in module "Texture Statistics Extraction" 316. Finally, the texture feature is represented by a "6D Feature Vector" 318 having six elements.

Figure 4:
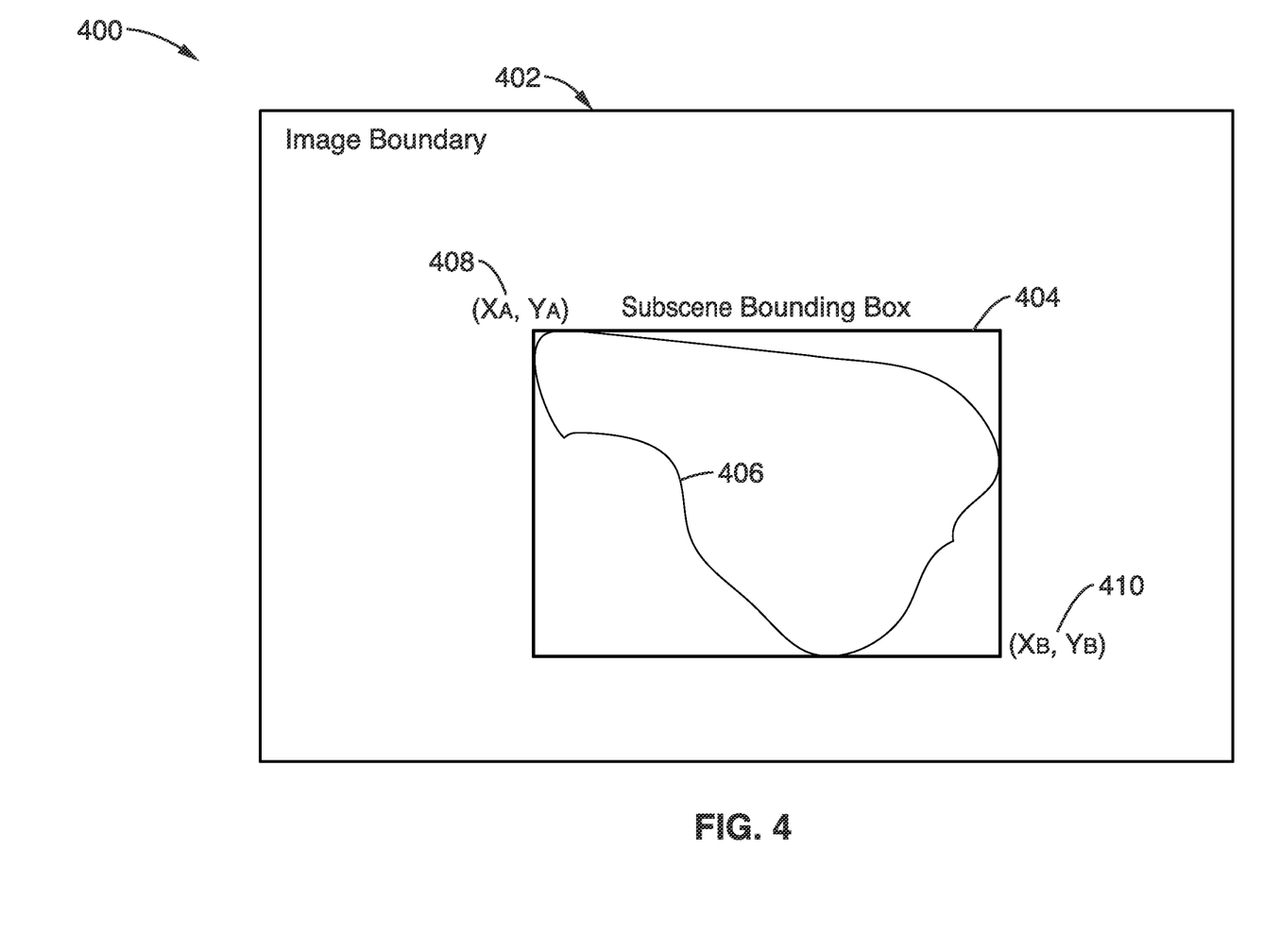
FIG. 4 is a diagram of a region spatial feature extraction method.

Among the "6D Feature Vector" 318, element 1 is the normalized number of horizontal edge points (H), element 2 is the normalized number of vertical edge points (V), element 3 is the larger of the normalized number of 45 degree ($N_{45}$) and the number of 135 degree edge points ($N_{135}$), element 4 is the normalized number of non-directional edge points ($N_{non-directional}$), element 5 is the sum of the normalized number of horizontal and vertical edge points (H+V), element 6 is the summation of the normalized number of 45 degree and 135 degree edge points ($N_{45}+N_{135}$). The resulting 6D Feature Vector 318 ($\vec{V}_{texture}$) can be written as:

$\vec{V}_{texture}=(H,V,\arg\max(N_{45},N_{135}),N_{non-directional},H+V,N_{45}+N_{135})$ Spatial Feature Extraction Refer now to FIG. 4, which is an illustration of an image 400 that has a spatial feature to be extracted. In this invention, the spatial feature is extracted from an input image 402 as follows:

1. For the input subscene region, a rectangular bounding box 404 is first drawn to surround the subscene region 406.

2. Let coordinates $(X_A, Y_A)$ denote 408 the upper left corner position of the bounding box 404 and let coordinates $(X_B, Y_B)$ denote 410 the lower right corner position of the bounding box 404. With these initial coordinates, the width of the bounding box 404 may be calculated as $|X_A - X_B|$ and the height of the bounding box 404 can be calculated as $|Y_A - Y_B|$. A width to height ratio of the subscene region 406 region may be calculated as $$\text{Ratio} = \frac{|X_A - X_B|}{|Y_A - Y_B|}$$

3. With the width to height ratio (Ratio) of the subscene region 406 calculated, the total number of the pixels in the subscene region 406 may be calculated and the subscene region compactness may be calculated as follows:

$$\text{Compactness} = \frac{N_{substance}}{|X_A - X_B| * |Y_A - Y_B|}$$

where ($N_{subscene}$) denotes the total number of pixels in the subscene region 406.

4. Next, the spatial feature characteristic of the subscene region 406 may be represented by a vector comprising four elements. Among them, element 1 is the top position ($Y_A$) of the subscene region 406, element 2 is the bottom position ($Y_B$) of the subscene region 406, element 3 is the width to height ratio (Ratio) of the subscene region 406, element 4 is subscene region compactness (Compactness). The resulting 4D vector ($\vec{V}_{spatial}$) is:

$$\vec{V}_{spatial} = (Y_A, Y_B, \text{Ratio}, \text{Compactness})$$

Subscene Region Feature Formation

After the color feature, texture feature, and spatial feature are calculated, they are concatenated sequentially to form a 16 dimension subscene region feature vector ($\vec{V}_{subscene}$) to represent the subscene region 406:

$$\vec{V}_{subscene} = (\vec{V}_{color}, \vec{V}_{texture}, \vec{V}_{spatial})$$

Based on $\vec{V}_{subscene}$, a subscene model is then developed.

III. Subscene Modeling Based on Region Feature

Through many years of investigation, two approaches have been proposed for general object or scene recognition. One approach is discriminative based, which basically trains classifiers to find decision boundaries in the feature space to separate one class from the others. However, the discrimination approach requires a sufficient amount of training data to achieve a complete description of all others. In reality, the sufficient amount is impossible to achieve. As soon as new data is available, the training must be redone.

The second recognition approach is generative based. This is different from the previously described classifier based approach in that it only models the target class and assumes all other classes have different distributions. After the generative model is learned from the training data, the probability density of a subscene region can be estimated based on the maximum likelihood between the subscene feature and the corresponding generative model.

In this invention, the generative approach is used to develop a multivariable Gaussian mixture based subscene model for subscene representation. By using a feature vector $\vec{X}$ having d dimensionality, a multivariable Gaussian distribution can be described as follows:

$$p_k(\vec{X}) = \frac{1}{(2\pi)^{d/2} \|S_k\|^{1/2}} \exp\left(\frac{1}{2}(\vec{X} - \vec{M}_k)^T [S_k]^{-1}(\vec{X} - \vec{M}_k)\right)$$

A Gaussian mixture can be described as:

$$P(\vec{X}; \vec{M}_k, [S_k], w_k) = \sum_{k=1}^{m} w_k p_k(\vec{X}),$$

$$w_k \geq 0, \sum_{k=1}^{m} w_k = 1$$

where m is the number of mixtures or clusters, $\vec{M}_k$ is the mean vector, $[S_k]$ is the covariance matrix, $\|S_k\|^{1/2}$ is the norm of the covariance matrix, and $w_k$ is the weight of $k^{th}$ cluster. When the training data and the number of clusters m are known, an expectation-maximization (EM) algorithm is used to estimate the parameters of the Gaussian mixture. Therefore, for fixed training data and m clusters, the parameters $\vec{M}_k$, $[S_k]$, and $w_k$ are fixed. Once the training data is fixed, the key to achieve a good Gaussian mixture model is to find a suitable value for the number of clusters, m. Smaller numbers of clusters m usually generate looser models that have very weak discriminative powers. On the other hand, too large a number of clusters m will generate an over-fit model that can only recognize the training data.

Figure 5:
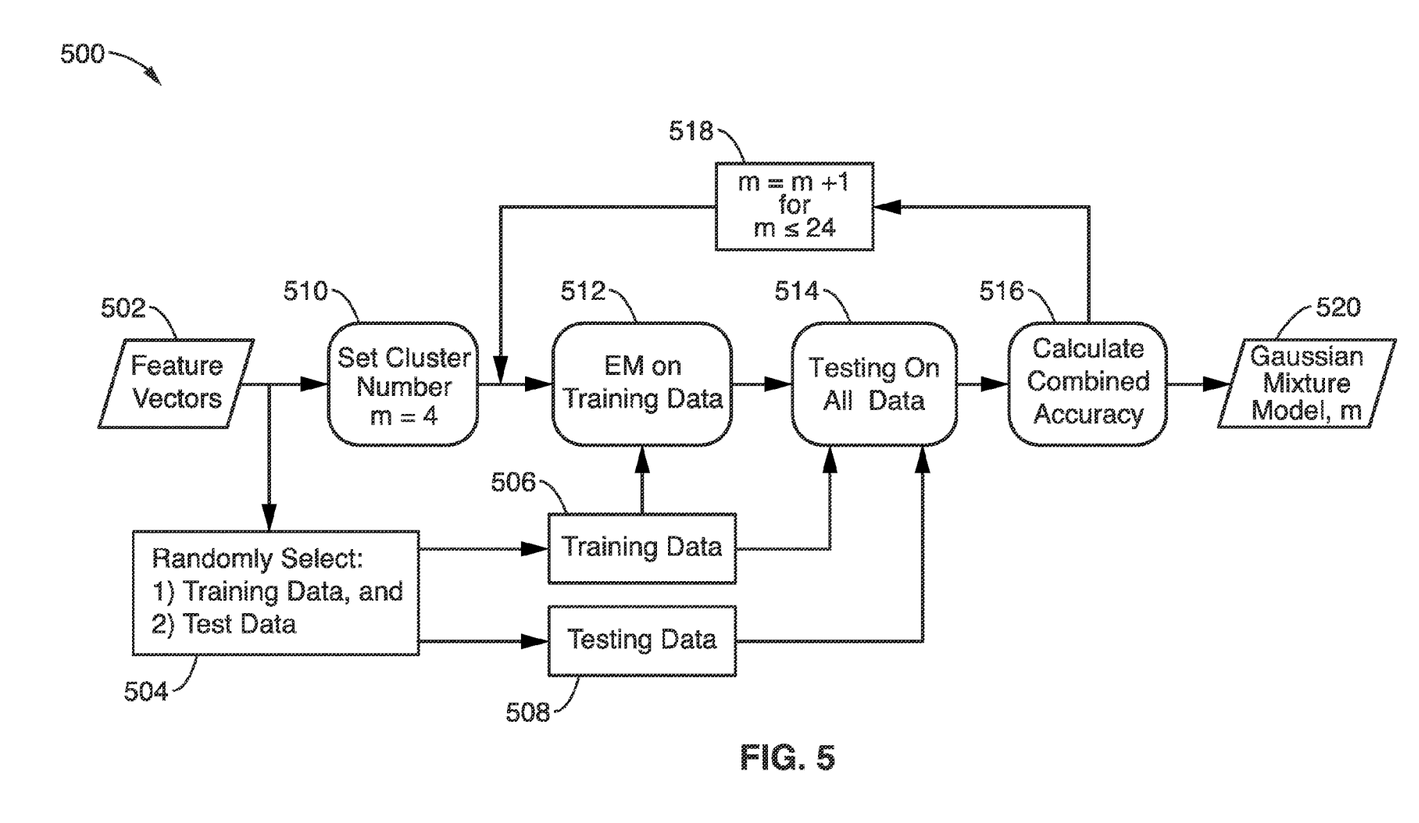
FIG. 5 is a flow chart for determining the optimal number of clusters in the subscene modeling process.

Refer now to FIG. 5, which is a flowchart of the method used to find a suitable number of clusters, m, for subscene modeling 500. Initially, all input feature vectors 502 are randomly divided 504 into training data 506 and testing data 508. The subscene model is then constructed as follows:

1. Initialize a number of clusters equal to a small number index m (where ranges from 4≤m≤24 in a current embodiment 510).

2. Apply the expectation-maximization (EM) algorithm 512 with m clusters on the training data 506 to obtain an $m^{th}$ Gaussian mixture model.

3. Test 514: 1) the obtained $m^{th}$ Gaussian mixture model on the training data 506 to obtain a training accuracy rate $\text{Accuracy}_{training}(m)$; and 2) the obtained Gaussian mixture model on the testing data 508 to obtain a testing accuracy rate $\text{Accuracy}_{testing}(m)$. Calculate the combined accuracy rate $\text{Accuracy}_{combined}(m)$ 516 as:

$$\text{Accuracy}_{combined}(m) = \begin{cases} \text{Accuracy}_{training}(m) + \\ \text{Accuracy}_{testing}(m) - \\ c_1 * |\text{Accuracy}_{training}(m) - \text{Accuracy}_{testing}(m)| \end{cases}$$

where $c_1$ is a weighting parameter that ranges from [0-0.5].

4. Increase the number of clusters m by one (m+1) 518 and repeat the above steps 2-3 until the number of clusters m reaches a maximum threshold (which is 24 in a current embodiment).

5. Select and output 520 the model that has the highest combined Accuracy$_{combined}$(m) rate as:

$$\underset{m}{\mathrm{argmax}}(Accuracy_{combined}(m))$$

Figure 6:
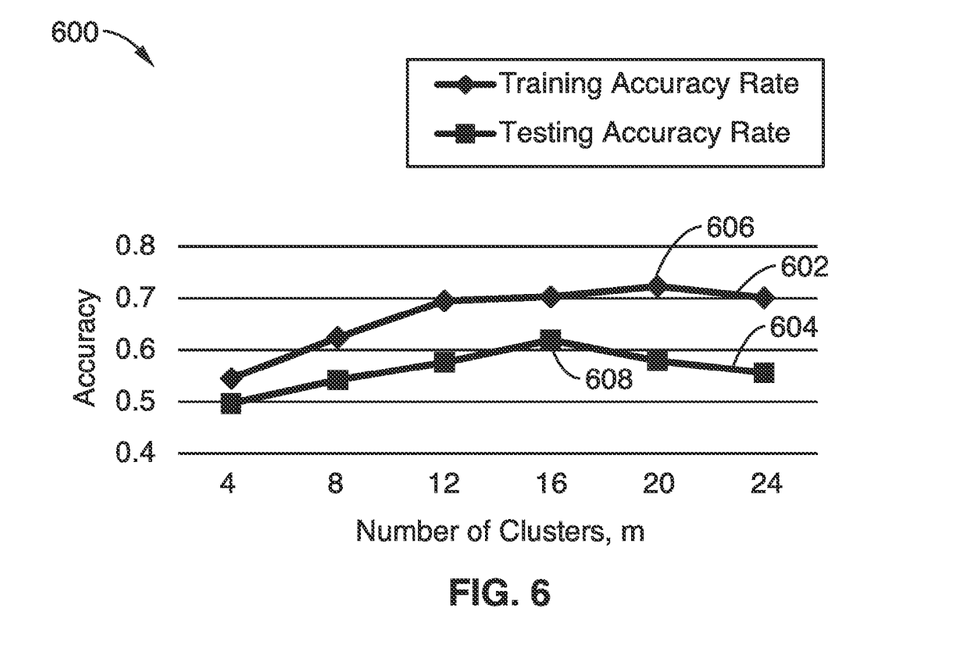
FIG. 6 is a graph of one example of the subscene modeling process with training and testing accuracy versus the number of clusters.

Refer now to FIG. 6, which graphs 600 accuracy versus the number of clusters m for the Accuracy$_{training}$ (m) rate 602 and the Accuracy$_{testing}$(m) rate 604. It appears that the maximum Accuracy$_{training}$(m) rate is obtained 606 for a particular test training data set when the number of clusters m is 20. The maximum Accuracy$_{testing}$(m) rate 608 is obtained for testing data when the number of clusters m is 16.

Figure 7:
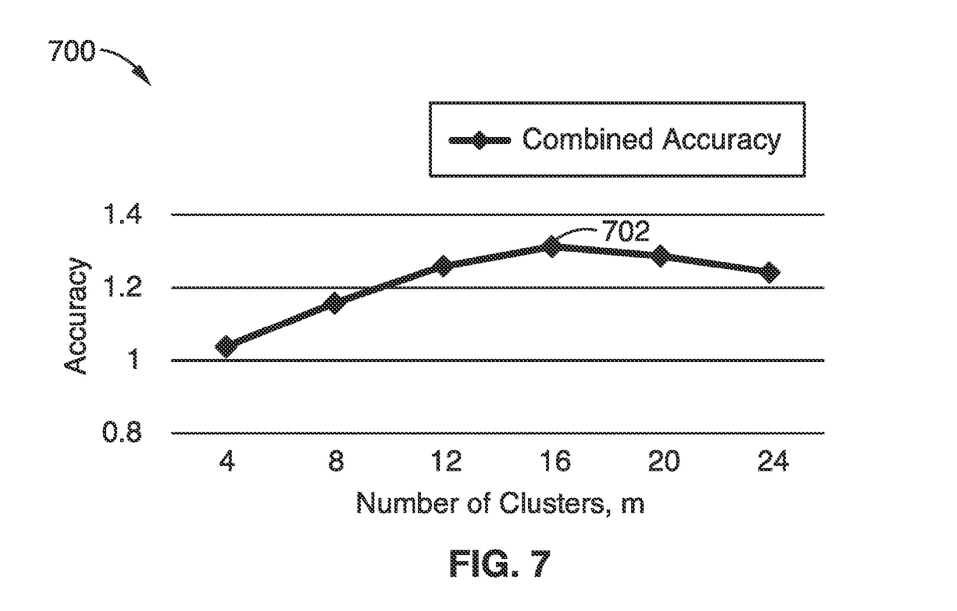
FIG. 7 is a graph of one example of the subscene modeling process with cluster selection curve versus the number of clusters.

Refer now to FIG. 7, which graphs the Accuracy$_{combined}$ (m) versus the number of cluster m, 700. Here, the maximum Accuracy$_{combined}$(m) is obtained when the number of clusters, m, is equal to 16. Therefore, in this example, 16 is selected as the number of clusters m as the best model.

IV. Subscene Recognition

By using the region feature extraction and modeling processes described herein, one can generate a representation model for nearly any subscene category. The subscene can be recognized based on a representation model output corresponding to the subscene region feature. When a new image is obtained, subscene recognition can be used to annotate each region of the image. By combining all subscenes regions in an image, a complete representation of an image may be obtained.

Figure 8:
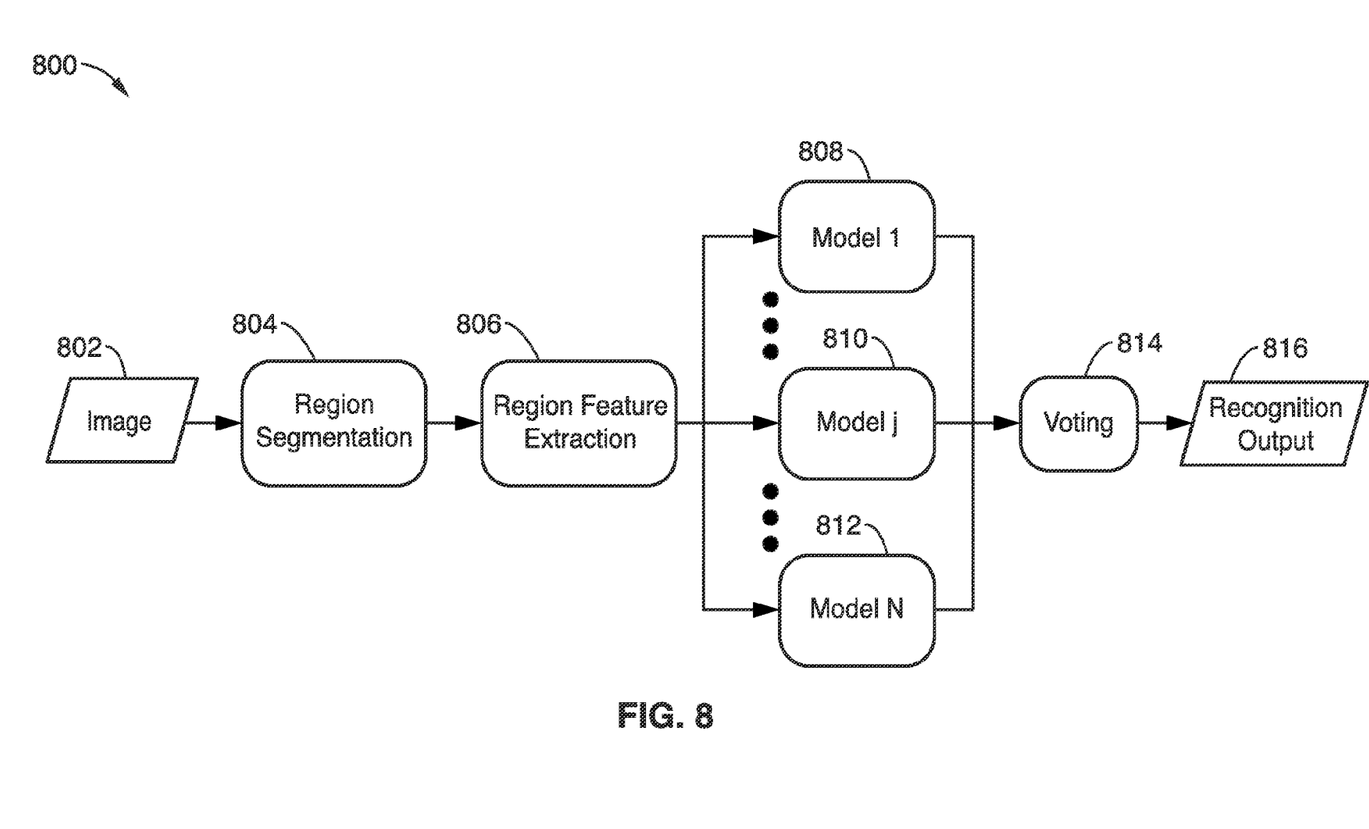
FIG. 8 is a flow chart depicting how a new input image is compared with N subscene models.

Refer now to FIG. 8, which is a flowchart of the overall subscene recognition scheme described herein 800. It can be applied as follows:

1. Given an input image 802, segment 804 the input image 802 into a set of regions. Users may choose any good segmentation technique to perform the segmentation.

2. For each region, region features including a color feature, a texture feature, and a spatial feature are extracted in the region feature extraction module 806.

3. After a region feature X is extracted, it is used as input into different subscene models, from Model 1 808, to Model j 810, to Model N 812 of N models (where 1≤j≤N). Each model has a corresponding calculated output:

$$O_j = \frac{1}{1 + e^{-CP}}$$

where j is an index for the specified subscene category, C is a constant parameter, and P is calculated as follows:

$$P = \log(P(\vec{X}; \vec{M}_j, [S_j], w_j))$$

4. After all the N model outputs are obtained, the model with the maximum output is selected as the recognition result.

$$\underset{j}{\mathrm{argmax}} = (O_0, O_1, \ldots O_j, \ldots, O_N)$$

The above procedure is continued until all the segmented regions are processed.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, parallel processing video or other coprocessor, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s From the discussion above it will be appreciated that the invention can be embodied in various ways, including the following:

1. An image classification apparatus, comprising: a computer; and
programming executable on said computer for classifying an input image.

2. The apparatus of embodiment 1, wherein said classifying an input image comprises: subscene modeling; and performing subscene recognition.

3. The apparatus of embodiment 2, wherein said subscene modeling comprises: segmenting an input image training set from an image database into one or more segmented regions based on an input pool of N subscene categories; extracting a training region feature vector for each of the segmented regions corresponding to the input pool of N subscene categories; and forming a subscene model pool comprising training region feature vectors for each for the input pool of N subscene categories.

4. The apparatus of embodiment 1, wherein the computer is capable of classifying an image either sequentially or at least partially in parallel.

5. The apparatus of embodiment 3, wherein said subscene recognition comprises: segmenting the input image into a set of input regions; extracting a region feature corresponding to each of the set of input regions to form a set of extracted region feature vectors; and filtering the set of extracted region features against the subscene model pool to form a filtered output.

6. The apparatus of embodiment 5, wherein said subscene recognition further comprises selecting the set of subscene categories corresponding to one or more of the largest filtered outputs.

7. The apparatus of embodiment 5, wherein said subscene recognition further comprises: setting a subscene to one of a group consisting of: the training region feature vector and the set of extracted region feature vectors; and describing the subscene by a concatenated subscene feature vector $\vec{V}_{subscene}$ comprising: a color feature vector $\vec{V}_{color}$; a texture feature vector $\vec{V}_{texture}$; and a spatial feature vector $\vec{V}_{spatial}$; wherein the subscene is in a YCbCr color space with a luminance Y channel, a blue chrominance Cb channel, and a red chrominance Cr channel.

8. The apparatus of embodiment 7, wherein the color feature vector $\vec{V}_{color}$ is calculated in the subscene using steps comprising: calculating a mean value of the luminance $\overline{Y}$ channel and mean values $\overline{Cb}$ and red $\overline{Cr}$ respectively for both the blue Cb and red Cr chrominance channels.

9. The apparatus of embodiment 8, wherein the color feature vector $\vec{V}_{color}$ is calculated in the subscene using steps further comprising: calculating a two dimensional (2D) chrominance histogram of both the blue Cb and red Cr chrominance channels; wherein the histogram comprises bins.

10. The apparatus of embodiment 9, wherein the color feature vector $\vec{V}_{color}$ is calculated in the subscene using steps further comprising: calculating a subscene luminance variance as:

$$\text{Var}(Y) = \frac{1}{N}\sum_{i=1}^{N}(Y_i - \overline{Y})^2;$$

and calculating a subscene chrominance variance as:

$$\text{Var}(CbCr) = \frac{1}{N}\left(\sum_{i=1}^{N}(Cb_i - \overline{Cb})^2 + (Cr_i - \overline{Cr})^2\right)$$

where N denotes a number of pixels in the subscene, $Y_i$, $Cb_i$, and $Cr_i$ denote a pixel value in position i in the subscene in each of the luminance Y channel, and the blue Cb and red Cr chrominance channels, $\overline{Y}$ represents the mean value of Y, $\overline{Cb}$ represents the mean value of Cb, and $\overline{Cr}$ represents the mean value of Cr.

11. The apparatus of embodiment 10, wherein the color feature vector $\vec{V}_{color}$ is calculated in the subscene using steps further comprising: setting a largest valued of the (2D) chrominance histogram bin's corresponding Cb and Cr values respectively as dominant values $D_{Cb}$ and $D_{Cr}$.

12. The apparatus of embodiment 11, wherein the color feature vector $\vec{V}_{color}$ is calculated in the subscene using steps further comprising: calculating a colorfulness value as Colorfulness=$|D_{Cb}-D_{Cr}|$.

13. The apparatus of embodiment 12, wherein the color feature vector $\vec{V}_{color}$ is calculated for the subscene using steps further comprising: forming a 6 dimension (6D) color feature vector ($\vec{V}_{color}$) as $\vec{V}_{color}$=($\overline{Y}$,Var(Y), Var(CbCr),$D_{Cb}$,$D_{Cr}$,Colorfulness).

14. The apparatus of embodiment 13, wherein the texture feature vector $\vec{V}_{texture}$ is calculated in the subscene using steps comprising: performing an edge detection procedure on the luminance channel (Y domain) to generate a set of edge points; categorizing each edge point into a horizontal, vertical, 45°, or 135° edge, non-directional edge, and non-edge point.

15. The apparatus of embodiment 14, wherein the texture feature vector $\vec{V}_{texture}$ is calculated in the subscene using steps comprising: accumulating a sum of a normalized number of horizontal edge points (H) from the horizontal edge points; accumulating a sum of a normalized number of vertical edge points (V) from the vertical edge points; accumulating a sum of a normalized number ($N_{45}$) of 45 degree edge points from the 45° edge points; accumulating a sum of a normalized number of 135 degree ($N_{135}$) edge points from the 135° edge points; accumulating a sum of a normalized number of non-directional ($N_{non-directional}$) edge points from the non-directional edge points; forming a sum of a normalized number of horizontal and vertical (H+V) edge points from a sum of the horizontal and vertical edge points; forming a sum of a normalized number of 45 degree and 135 degree ($N_{45}$+$N_{135}$) edge points from a sum of the 45° and 135° edge points.

16. The apparatus of embodiment 15, wherein the texture feature vector $\vec{V}_{texture}$ is calculated using steps comprising: forming a concatenated 6D texture feature vector ($\vec{V}_{texture}$), wherein $\vec{V}_{texture}$=(H,V,arg max($N_{45}$, $N_{135}$), $N_{non-directional}$, H+V, $N_{45}$+$N_{135}$).

17. The apparatus of embodiment 7, wherein the spatial feature vector $\vec{V}_{spatial}$ is calculated in the subscene using steps comprising: forming a rectangular bounding box around the subscene; wherein the rectangular bounding box has an upper left Y coordinate of $Y_A$, and the lower right Y coordinate of $Y_B$; calculating a Ratio of width over height of the rectangular bounding box; calculating a Compactness of the subscene; and forming the spatial feature vector, wherein $\vec{V}_{spatial}$=($Y_A$,$Y_B$,Ratio,Compactness).

18. The apparatus of embodiment 16, wherein the subscene feature vector $\vec{V}_{subscene}$ comprises: $\vec{V}_{subscene}$=($\vec{V}_{color}$, $\vec{V}_{texture}$, $\vec{V}_{spatial}$); wherein $\vec{V}_{subscene}$ written in detail comprises:

$$\vec{V}_{subscene} = \begin{pmatrix} \overline{Y}, \text{Var}(Y), \text{Var}(CbCr), D_{Cb}, D_{Cr}, \text{Colorfulness}, \\ H, V, \text{argmax}(N_{45}, N_{135}), N_{non-directional}, H+V, N_{45}+N_{135}, \\ Y_A, Y_B, \text{Ratio, Compactness} \end{pmatrix}.$$

19. The apparatus of embodiment 3, wherein said subscene modeling comprises: selecting an optimal number of clusters in the step of forming the subscene model pool.

20. The apparatus of embodiment 1, wherein said programming is stored on a computer readable medium.

21. The apparatus of embodiment 2, wherein said subscene recognition is performed on a set of photographs.

22. An image classification apparatus, comprising: a computer; and programming executable on the computer for classifying an input image; wherein said classifying comprises: (a) performing subscene recognition; and (b) performing subscene modeling; (c) wherein said subscene modeling comprises: (i) segmenting an input image training set from an image database into one or more segmented regions based on an input pool of N subscene categories; (ii) extracting a training region feature vector for each of the segmented regions corresponding to the input pool of N subscene categories; and (iii) forming a subscene model pool comprising training region feature vectors for each for the input pool of N subscene categories.

23. An image classification apparatus, comprising: a computer; and programming executable on the computer for classifying an input image; wherein said classifying comprises: subscene modeling; and performing subscene recognition.

24. A computer readable media on which instructions on stored, said instructions executable by a computer, said instructions carrying out steps comprising: classifying an input image; wherein said classifying comprises: subscene modeling; and performing subscene recognition.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An image classification apparatus, comprising:
 a computer; and
 programming executable on said computer for classifying an input image by performing steps comprising:
   (a) forming a concatenated 6D texture feature vector texture ($\vec{V}_{texture}$) as a sum of a normalized number of 45 degree and 135 degree ($N_{45}+N_{135}$) edge points from a sum of 45° and 135° edge points;
   (b) performing subscene modeling by:
     (i) segmenting an input image training set from an image database into one or more segmented regions based on an input pool of N subscene categories;
     (ii) extracting a training region feature vector for each of the segmented regions corresponding to the input pool of N subscene categories; and
     (iii) forming a subscene model pool comprising training region feature vectors for each for the input pool of N subscene categories; and
   (c) performing subscene recognition by:
     (i) segmenting the input image into a set of input regions;
     (ii) extracting a region feature corresponding to each of the set of input regions to form a set of extracted region feature vectors;
     (iii) filtering the set of extracted region features against the subscene model pool to form a filtered output;
     (iv) setting a subscene to one of a group consisting of: the training region feature vector and the set of extracted region feature vectors; and
     (v) describing the subscene by a concatenated subscene feature vector $\vec{V}_{subscene}$ comprising:
       a color feature vector $\vec{V}_{color}$;
       the texture feature vector $\vec{V}_{texture}$; and
       a spatial feature vector $\vec{V}_{spatial}$;
       wherein the subscene is in a YCbCr color space with a luminance Y channel, a blue chrominance Cb channel, and a red chrominance Cr channel;
     (vi) wherein the color feature vector $\vec{V}_{color}$ is calculated in the subscene using steps comprising:
       calculating a mean value of the luminance $\overline{Y}$ channel and mean values blue $\overline{Cb}$ and red $\overline{Cr}$ respectively for both the blue Cb and red Cr chrominance channels;
       calculating a two dimensional (2D) chrominance histogram of both the blue Cb and red Cr chrominance channels, wherein the histogram comprises bins;
       calculating a subscene luminance variance as:

$$\text{Var}(Y) = \frac{1}{N}\sum_{i=1}^{N}(Y_i - \overline{Y})^2;$$

and
       calculating a subscene chrominance variance as:

$$\text{Var}(CbCr) = \frac{1}{N}\left(\sum_{i=1}^{N}(Cb_i - \overline{Cb})^2 + (Cr_i - \overline{Cr})^2\right);$$

where N denotes a number of pixels in the subscene, $Y_i$, $Cb_i$, and $Cr_i$, denote a pixel value in position i in the subscene in each of the luminance Y channel, and the blue Cb and red Cr chrominance channels, $\overline{Y}$ represents the mean value of Y, $\overline{Cb}$ represents the mean value of Cb, and $\overline{Cr}$ represents the mean value of Cr.

2. The apparatus of claim 1, wherein the computer is capable of classifying an image either sequentially or at least partially in parallel.

3. The apparatus of claim 1, wherein said subscene recognition further comprises selecting the set of subscene categories corresponding to one or more of the largest filtered outputs.

4. The apparatus of claim 1, wherein the color feature vector $\vec{V}_{color}$ is calculated in the subscene using steps further comprising:
 setting a largest valued of the (2D) chrominance histogram bin's corresponding Cb and Cr values respectively as dominant values $D_{Cb}$ and $D_{Cr}$.

5. The apparatus of claim 4, wherein the color feature vector $\vec{V}_{color}$ is calculated in the subscene using steps further comprising:
   calculating a colorfulness value as Colorfulness $=|D_{Cb}-D_{Cr}|$.

6. The apparatus of claim 5, wherein the color feature vector $\vec{V}_{color}$ is calculated for the subscene using steps further comprising:
   forming a 6 dimension (6D) color feature vector ($\vec{V}_{color}$) as $\vec{V}_{color}=(\overline{Y},\text{Var}(Y),\text{Var}(CbCr),D_{Cb},D_{Cr},\text{Colorfulness})$.

7. The apparatus of claim 6, wherein the texture feature vector $\vec{V}_{texture}$ is calculated in the subscene using steps comprising:
   performing an edge detection procedure on the luminance channel (Y domain) to generate a set of edge points;
   categorizing each edge point into a horizontal, vertical, 45°, or 135° edge, non-directional edge, and non-edge point.

8. The apparatus of claim 7, wherein the texture feature vector $\vec{V}_{texture}$ is calculated in the subscene using steps further comprising:
   accumulating a sum of a normalized number of horizontal edge points (H) from the horizontal edge points;
   accumulating a sum of a normalized number of vertical edge points (V) from the vertical edge points;
   accumulating the sum of a normalized number ($N_{45}$) of 45 degree edge points from the 45° edge points;
   accumulating the sum of a normalized number of 135 degree ($N_{135}$) edge points from the 135° edge points;
   accumulating a sum of a normalized number of non-directional ($N_{non-directional}$) edge points from the non-directional edge points;
   forming a sum of a normalized number of horizontal and vertical (H+V) edge points from a sum of the horizontal and vertical edge points.

9. The apparatus of claim 8, wherein the texture feature vector $\vec{V}_{texture}$ is calculated using steps comprising:
   forming the concatenated 6D texture feature vector ($\vec{V}_{texture}$), wherein $\vec{V}_{texture}=(H,V,\arg\max(N_{45},N_{135}),N_{non-directional},H+V,N_{45}+N_{135})$.

10. The apparatus of claim 9, wherein the subscene feature vector $\vec{V}_{subscene}$ comprises:

$\vec{V}_{subscene}=(\vec{V}_{color},\vec{V}_{texture},\vec{V}_{spatial})$;

wherein $\vec{V}_{subscene}$ written in detail comprises:

$$\vec{V}_{subscene} = \begin{pmatrix} \overline{Y},\text{Var}(Y),\text{Var}(CbCr),D_{Cb},D_{Cr},\text{Colorfulness}, \\ H, V, \arg\max(N_{45}, N_{135}), N_{non-directional}, H+V, N_{45}+N_{135}, \\ Y_A, Y_B, \text{Ratio, Compactness} \end{pmatrix}.$$

11. The apparatus of claim 1, wherein the spatial feature vector $\vec{V}_{spatial}$ is calculated in the subscene using steps comprising:
    forming a rectangular bounding box around the subscene;
    wherein the rectangular bounding box has an upper left Y coordinate of $Y_A$, and the lower right Y coordinate of $Y_B$;
    calculating a Ratio of width over height of the rectangular bounding box;
    calculating a Compactness of the subscene; and
    forming the spatial feature vector, wherein $\vec{V}_{spatial}=(Y_A,Y_B,\text{Ratio},\text{Compactness})$.

12. The apparatus of claim 1, wherein said subscene modeling comprises:
    selecting an optimal number of clusters in the step of forming the subscene model pool.

13. The apparatus of claim 1, wherein said programming is stored on a computer readable medium.

14. The apparatus of claim 1, wherein said subscene recognition is performed on a set of photographs.

* * * * *